Dec. 17, 1968 J. F. ARENT 3,416,807

PHONOGRAPH TONE ARM

Filed April 5, 1965 4 Sheets-Sheet 1

INVENTOR
JOHN F. ARENT

BY
Brown, Jackson, Boettcher & Dienner
ATTYS.

INVENTOR
JOHN F. ARENT
BY
Brown, Jackson,
Boettcher + Dienner
ATTYS.

INVENTOR
JOHN F. ARENT
BY
Brown, Jackson, Boettcher & Dienner
ATTYS.

INVENTOR
JOHN F. ARENT
BY
Brown, Jackson, Boettcher & Dienner
ATTYS.

3,416,807
PHONOGRAPH TONE ARM

John F. Arent, Benton Harbor, Mich., assignor to V-M Corporation, Benton Harbor, Mich., a corporation of Michigan Filed Apr. 5, 1965, Ser. No. 445,525
14 Claims. (Cl. 274—23)

ABSTRACT OF THE DISCLOSURE

A phonograph tone arm asesembly which in the illustrated embodiment includes a housing mounted on a C-yoke for conjoint rotation therewith on a vertically disposed conical bearing and a tone arm fixed to a bracket which is suspended from the housing by a pair of flexible wires or members disposed on either side of the tone arm and having their upper ends secured to the housing. The intermediate portion of the two flexible members between the secured ends is free to flex so as to define a horizontal pivot axis about which the tone arm pivots, the tone arm being mounted on the bracket above said horizontal pivot axis. A spring is disposed above and across said horizontal axis having its rear end anchored to underneath the tone arm behind the horizontal pixot axis and having its forward end anchored to the housing forwardly of the horizontal pivot axis so that the tone arm maintains a constant stylus pressure at different record heights.

The present invention relates to an improved phonograph tone arm which provides important advantages over the tone arms heretofore known with respect to fidelity of musical reproduction and also reduced wear on records and on the stylus carried by the tone arm.

It is an object of the invention to provide a tone arm which is mounted in an improved manner so as to substantially reduce frictional resistance to movement of the tone arm about a horizontal pivot axis.

It is a further object of the invention to provide a tone arm which is mounted in an improved manner so as to substantially reduce frictional resistance to movement of the tone arm about a vertical pivot axis.

Another object of the invention is to provide a tone arm which is so mounted as to provide a substantially constant predetermined stylus pressure whether the record being reproduced is the first record dropped to the turntable or is at the top of a stack of records on the turntable.

An additional one of my objects is to provide a tone arm having counterweight means thereon for balancing the tone arm about its horizontal pivot axis, and additional means thereon for acting upon the tone arm after it has been balanced to provide a predetermined stylus pressure.

The foregoing and other objects and advantages of the invention will be apparent from the following description thereof.

Now in order to acquaint those skilled in the art with the manner of utilizing and practicing my invention, I shall describe, in conjunction with the accompanying drawings, certain preferred embodiments of the invention.

Figure 6:
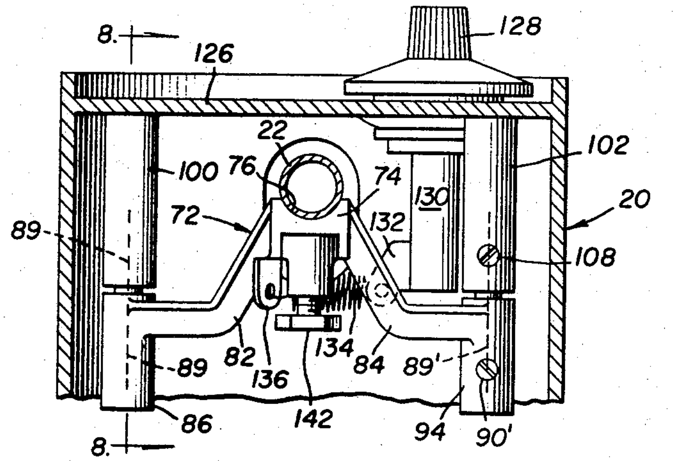
FIGURE 6 is a fragmentary vertical sectional view taken substantially along the line 6—6 of FIGURE 3.
Figures 7, 8:
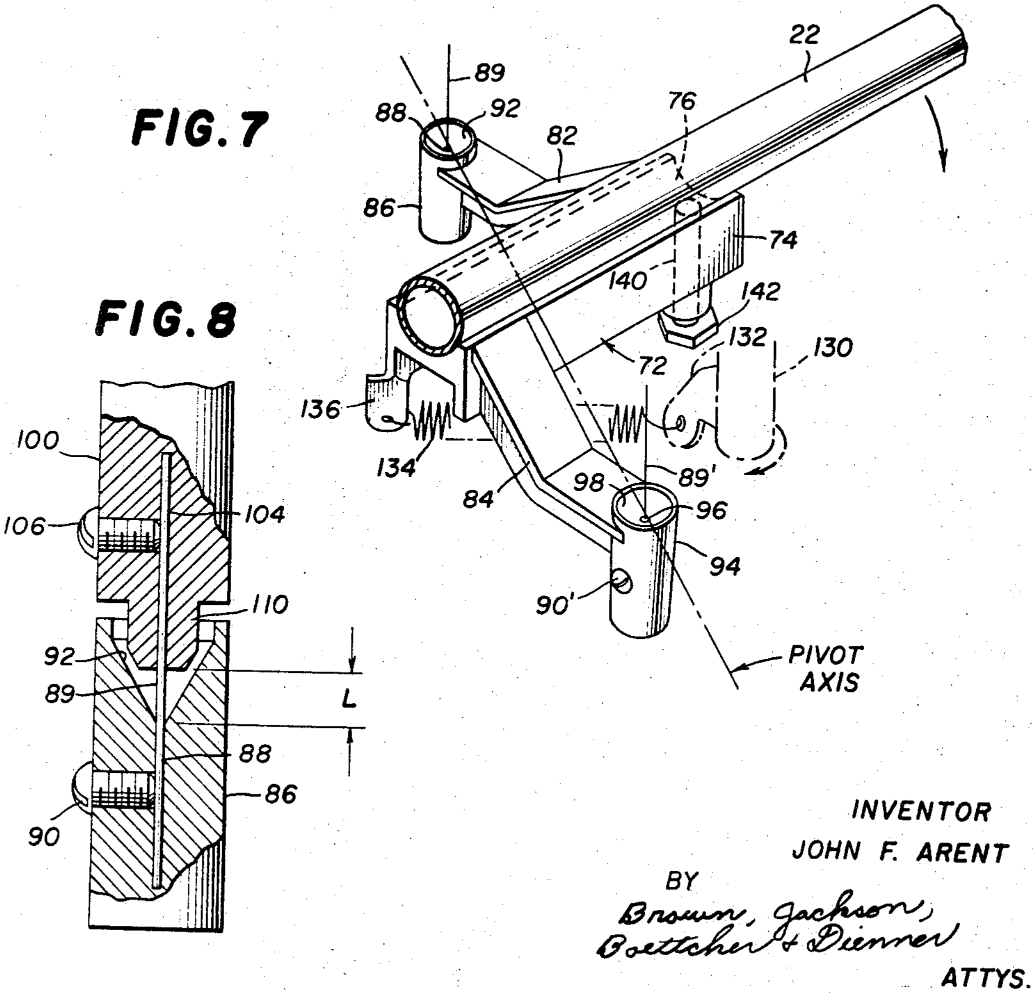
FIGURE 7 is a perspective view showing a hinge hanger member and a fragmentary portion of a tone arm tube which is secured to the top of the hinge hanger.
Figure 9:
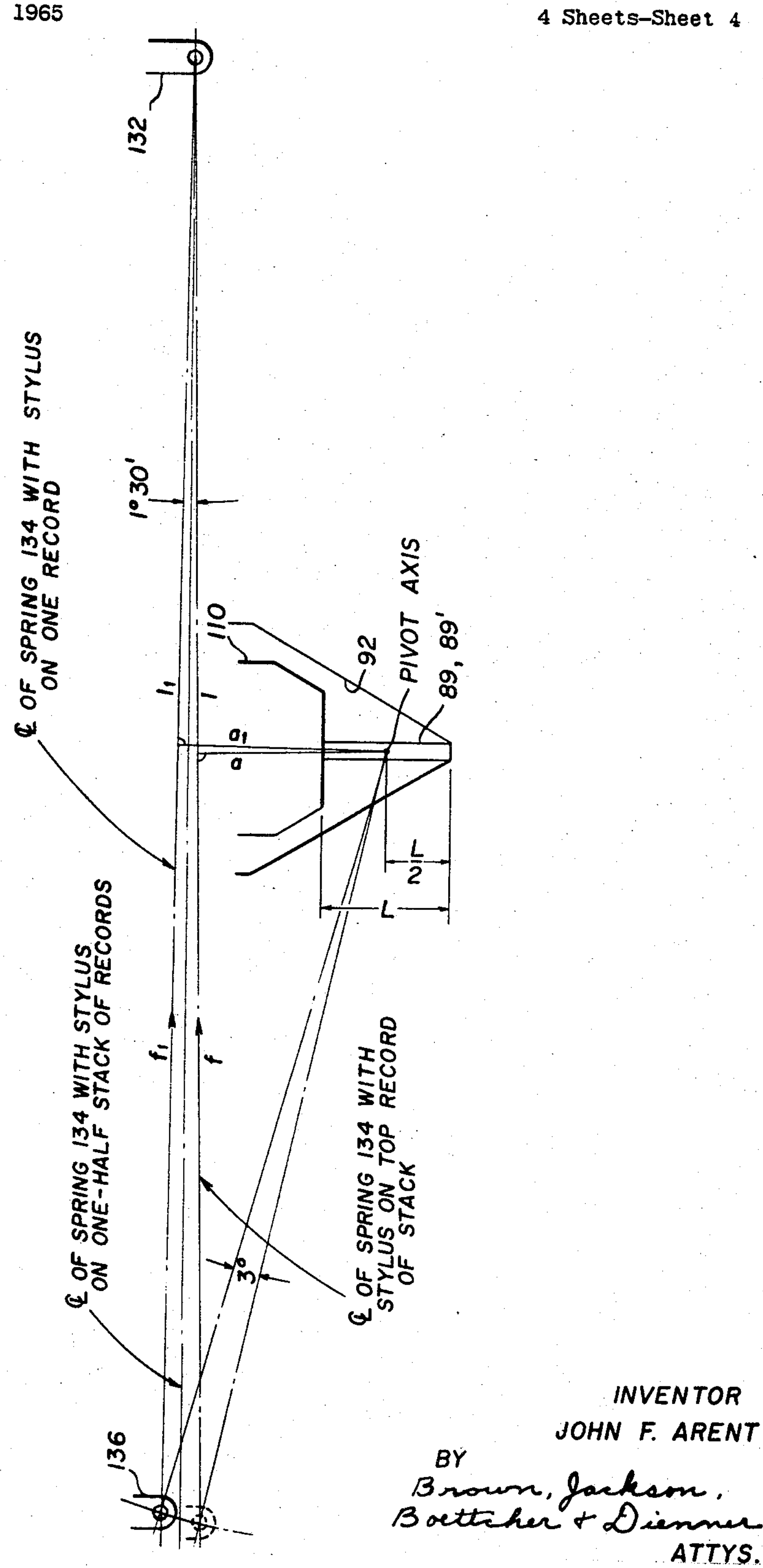

FIGURE 8 is an enlarged fragmentary vertical sectional view taken substantially along the line 8—8 of FIGURE 6; and FIGURE 9 is a substantially enlarged schematic view illustrating various positions of a stylus pressure control spring having one end adjustably positioned for a given predetermined stylus pressure and its other end anchored to the tone arm, such spring positions varying depending upon the number of records on the turntable.

Figure 1:
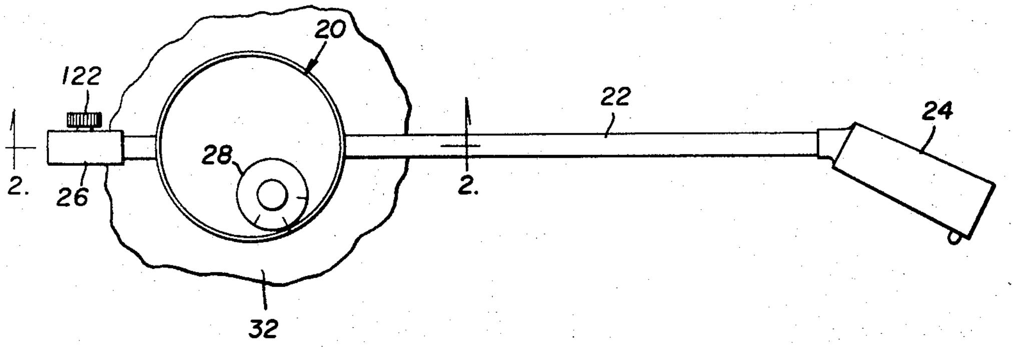
FIGURE 1 is a top plan view of a phonograph tone arm constructed in accordance with the present invention.
Figure 2:
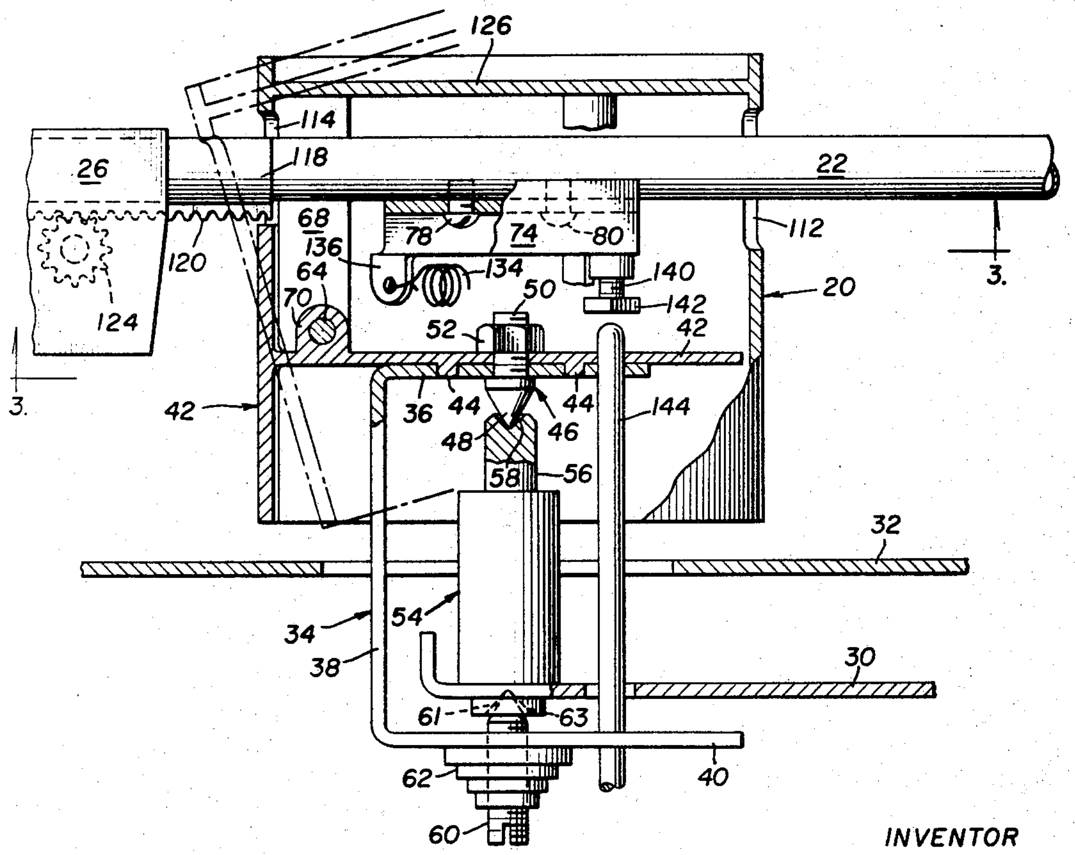
FIGURE 2 is an enlarged fragmentary vertical sectional view taken substantially along the 2—2 of FIGURE 1.

Referring now to the drawings, FIGURE 1 shows a tone arm assembly comprising a tone arm housing 20, a tone arm tube 22, a cartridge housing 24 fixedly mounted at the forward end of the tube for carrying a cartridge-stylus assembly (not shown), an adjustable counterweight 26 carried on the rear end of the tone arm tube, and an adjustable knob 28 for selecting a desired stylus pressure. The tone arm assembly is mounted on a record changer or phonograph by supporting the same from a sub-plate of the record changer. FIGURE 2 shows a fragmentary portion of a sub-plate 30 which may be spring mounted or otherwise supported from a record changer baseplate 32, whereby the tone arm housing 20 will be disposed above the baseplate. The springs or other suspending means for supporting the sub-plate 30 from the baseplate 32 are not a part of the present invention and are not described.

There is provided a tone arm pivot bracket or yoke 34 which is generally C-shaped in cross section and comprises an upper horizontal arm 36, a vertical arm 38, and a lower horizontal arm 40. A housing bracket 42 is mounted on the top of the yoke arm 36 and has a pair of locating studs 44 which project down into apertures in the arm 36. A pivot stud 46 has a conical lower end 48 and a threaded upper end 50, and the latter projects upwardly through the yoke arm 36 and housing bracket 42. A nut 52 is applied to the threaded end 50 so as to clamp together the housing bracket 42 and yoke arm 36.

A bearing post 54 is staked at its lower end to the sub-plate 30 and extends upwardly therefrom. The bearing post 54 has a reduced diameter upper end portion 56 which is provided with a conical recess 58 in the top thereof. The conical lower end 48 of the pivot stud 46 is seated in the conical recess 58 so that the assembly of the yoke 34 and bracket 42 is supported on the upper end of the bearing post 54 for rotation about a vertical axis. A pivot screw 60 having a conical upper end 61 is threaded upwardly through a boss 62 on the yoke arm 40 so as to engage in a conical recess 63 formed at the bottom of the bearing post 54. The pivot screw 60 is not made tight against the underside of the post 54 but is merely threaded upwardly far enough to engage the bottom of the post and thus take out the play. In this manner, the assembly of the yoke 34 and housing bracket 42 is stabilized while remaining free to rotate on the conical bearing 48 about a vertical axis. Because the assembly is supported vertically only at the conical bearing 48, frictional resistance to such rotation is reduced substantially to a minimum.

Figure 3:
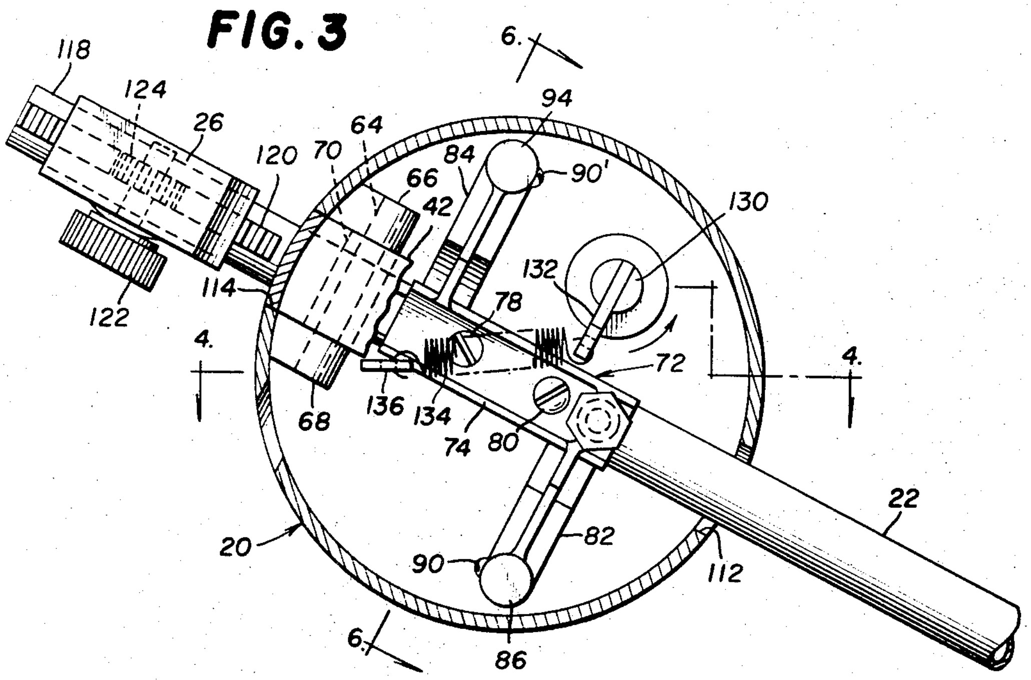
FIGURE 3 is a fragmentary horizontal sectional view taken substantially along the line 3—3 of FIGURE 2.

The housing or hinge cover 20 is pivotally mounted on the bracket 42 by a hinge pin 64. The housing 20 has the configuration of a hollow cylinder, and as best shown in FIGURE 3 it has a pair of spaced lugs 66 and 68 fixed to the inner wall thereof. A lug 70 formed on the housing bracket 42 projects up between the housing lugs 66 and 68, and the hinge pin 64 passes through the three aligned lugs 66, 68 and 70 so as to hingedly mount the housing 20 on the bracket 42. It should be understood, however, that in the normal operation of the tone arm, the housing 20 does not pivot on the pin 64 but remains in the position shown in solid lines in FIGURE 2. It is only when it is desired to replace a stylus or otherwise gain access inside the cartridge housing 24 that the housing 20 may be manually pivoted upwardly as partially shown in dash lines in FIGURE 2.

Reference is now made to FIGURE 7 which shows a hinge hanger member 72 to which the tone arm tube 22 is secured. The hinge hanger 72 includes a base portion 74 having an arcuate recess 76 along the length thereof in which the tone arm tube 22 is seated. The tone arm tube 22 is fixedly secured to the base 74 by a pair of screws 78 and 80 (see FIGURES 2 and 3). The hinge hanger 72 has a pair of arms 82 and 84 which project outwardly and downwardly from opposite sides of the base portion 74, the arms also being spaced along the length of the base so as to be disposed approximately at opposite ends thereof. The arm 82 has integral with the outer end thereof a cylindrical wire holding member 86 which is vertically disposed and has formed therein an axial bore 88 which is quite small in diameter and which receives one end of a length of music wire 89. The music wire 89 is fixedly held in the bore 88 by a set screw 90 (see FIGURE 8), and the wire extends above the top of the wire holder 86. In addition, a conical recess 92 is formed in the top of the wire holder 86. The arm 84 has formed thereon a similar wire holding member 94 with an axial bore 96 for holding one end of a length of music wire 89′ by means of a set screw 90′. The wire holder 94 has a conical recess 98 formed in the upper end thereof.

As best shown in FIGURE 6, the housing or hinge cover 20 is also provided with a pair of wire holding members. Thus, the housing 20 has a boss 100 fixedly mounted to the inner housing wall, and a similar boss 102 is also fixedly mounted to the inner housing wall at a location approximately diametrically opposite the boss 100. The housing boss 100 is provided with a small diameter vertical bore 104 (see FIGURE 8) for receiving the upper end of the length of music wire 89, and is also provided with a set screw 106 for clamping against the wire. The boss 102 has a similar bore for receiving the upper end of the wire 89′, and a set screw 108 holds the wire. Accordingly, the hinge hanger 72 is positioned inside the housing 20 with the hinge hanger wire holder 86 disposed immediately beneath the housing wire holder 100, and with the hinge hanger wire holder 94 disposed immediately beneath the housing wire holder 102. The upper end of the wire 89 extends up into the bore 104 in the boss or wire holder 100 and is held by the set screw 106, and in a similar fashion the wire 89′ extends up into the bore in the housing wire holder 102 and is gripped by the set screw 108. In this manner, the hinge hanger 72 and tone arm tube 22 are suspended from the housing 20 by the two wires 89 and 89′.

It will be seen from FIGURE 8 that at the bottom of the boss or wire holder 100 there is an integral stud 110 which projects downwardly into the conical recess 92 formed in the upper end of the hinge hanger wire holder 86. The stud 110 does not normally engage against the wall of the conical recess 92, but it is spaced in close proximity thereto. It will further be seen that the wire 89 is firmly held except along a short length indicated as L, which may be approximately 0.10 inch, and it is only along the free length L that the wire is permitted to bend. The wire 89 is protected against excessive bending if the components are subjected to shock since the hinge hanger wire holder 86 can only move a small limited amount relative to the housing wire holder 100 before the stud 110 will engage the wall of the conical recess 92 and prevent further relative movement, thereby protecting the wire 89. The wire holders 94 and 102 are similarly constructed so as to protect the wire 89′ against excessive bending.

It will be understood from the foregoing that the tone arm assembly comprising the tone arm tube 22 and the hinge hanger 72 is suspended from the housing or hinge cover 20 only by the two music wires 89 and 89′, each of which is able to bend only along a short free length indicated at L. It is of course well known that a tone arm must be able to pivot about a vertical axis and also about a horizontal axis. In the embodiment being described the tone arm can pivot about a vertical axis by conjoint rotation of the tone arm tube 22 and the housing 20 on the point of the conical bearing 48. In addition, the tone arm can pivot about a horizontal axis by bending of the wires 89 and 89′. Each of the latter wires will bend at a point approximately at the middle of the free length L thereof. Thus, the tone arm horizontal pivot axis is defined by a line which extends from the midpoint of the free length L of the wire 89 to the midpoint of the free length L of the wire 89′.

Figures 4, 5:
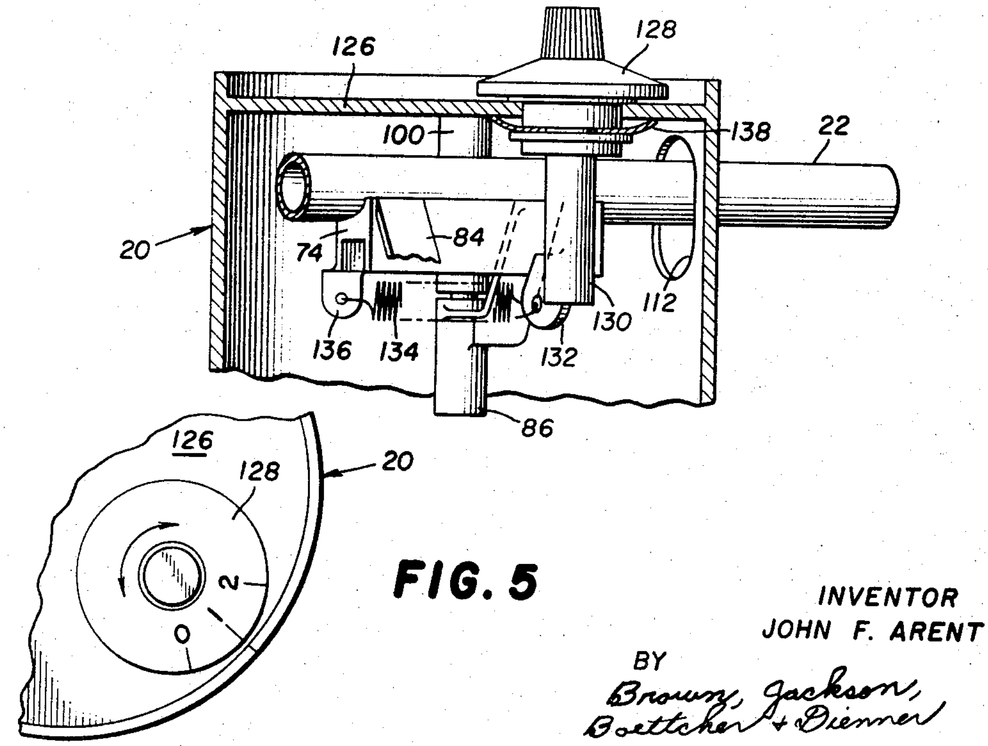
FIGURE 4 is a fragmentary vertical sectional view taken substantially along the line 4—4 of FIGURE 3.
FIGURE 5 is a fragmentary top plan view showing an adjusting knob at the top of a tone arm housing for manually selecting a desired stylus pressure.

FIGURE 4 shows an aperture 112 formed in the wall of the housing 20 to permit the tone arm tube 22 to project therethrough. In addition, FIGURE 2 shows a slot 114 in the wall of the housing 20 diametrically opposite the aperture 112, and the slot 114 extends from the bottom of the housing to a point close to the top thereof. Accordingly, the rear end of the tone arm tube 22 projects rearwardly out through the slot 114. Referring to FIGURES 2 and 3, the counterweight 26 is carried on the rear end of the tone arm tube 22. The rear end of the tube has an extension 118 having a plurality of rack teeth 120 formed on the underside thereof, and the counterweight 26 is apertured so that it will fit over the extension 118. The counterweight 26 carries a rotatable knob 122 having secured thereto a small pinion 124, and the pinion 124 is disposed immediately beneath the rack teeth 120 so as to engage therewith. It will be seen that when the knob 122 is manually rotated, the counterweight 26 will be moved in either direction along the length of the tone arm extension 118. Thus, by rotating the knob 122, it is a simple matter to balance the tone arm assembly about its horizontal pivot axis. In using the tone arm of the present invention, the tone arm should first be balanced about its horizontal pivot axis in the manner described, and thereafter a predetermined stylus pressure may be induced. The mechanism for selecting the desired stylus pressure will now be described.

The housing 20 is provided with a top wall 126, and a stylus pressure control knob 128 is disposed on top of the wall 126 and has a shaft 130 which projects down through the wall into the housing 20. Referring to FIGURES 4 and 6, there is a lug 132 formed at the lower end of the shaft 130, and one end of a tension spring 134 is secured thereto. The other end of the tension spring 134 is anchored to a lug 136 which projects downwardly from the rear end of the base 74 of the hinge hanger 72. As will be explained more fully hereinafter, the spring 134 when loaded serves to produce a moment about the tone arm horizontal pivot axis which creates a downward force at the forward end of the tone arm tube 22 which carries the cartridge housing 24. FIGURE 4 shows a spring washer 138 which retains the knob 128 in position while permitting it to rotate, and when the knob 128 is manually rotated the spring 134 is stretched so as to produce an upward pull at the rear end of the tone arm thereby inducing a stylus pressure at the forward end of the tone arm. Referring to FIGURE 5, it will be seen that the knob 128 is calibrated in grams of stylus pressure. In order to provide a desired stylus pressure, the knob 128 is first set at zero which relaxes the spring 134, and then the counterweight 26 is positioned by rotating the knob 122 until the tone arm is balanced about its horizontal pivot axis. Thereafter, the knob 128 is rotated in a clockwise direction as viewed in FIGURE 5 to load the spring 134 and induce the desired number of grams of stylus pressure.

One of the important advantages of the stylus pressure control mechanism of the present invention is that the stylus pressure once selected is substantially constant whether the tone arm is positioned for playing the first record on the turntable or whether it is positioned for playing the top one of a large stack of records on the turntable. As previously noted, the horizontal pivot axis for the tone arm 22 is defined by a line drawn from the midpoint of the free length L of the vertical wire 89 to the midpoint of the free length L of the vertical wire 89'. Since the purpose of the tension spring 134 is to produce a stylus pressure after balancing the tone arm, the spring 134 must be above the horizontal pivot axis in all playing positions of the tone arm. That is, referring for example to FIGURE 7, the lug 132 pulls forwardly and to one side on the tension spring 134 which has its rear end anchored to the lug 136, and the lug 132 is forwardly of the pivot axis while the lug 136 is rearwardly thereof. Consequently, in order that the spring 134 when loaded will produce a stylus pressure, the spring must be disposed above the horizontal pivot axis so as to produce a moment which will tend to raise the rear end of the tone arm 22 and lower the forward end which carries the cartridge housing 24.

When the control knob 128 is set at zero and the counterweight 26 is positioned to balance the tone arm assembly about its horizontal pivot axis, then the spring 134 will be disposed in a horizontal position above the horizontal pivot axis, but will be relaxed so as to produce no force. When the knob 128 is then rotated in a clockwise direction as viewed in FIGURE 5 to produce a predetermined stylus force, the spring 134 will be stretched to produce a moment about the horizontal pivot axis which urges the forward end of the tone arm 22 downwardly so as to induce the selected force at the stylus. Thereafter, the stylus force will remain virtually constant even though the pivotal playing position of the tone arm will vary depending upon how many records there are on the turntable.

When approximately half of the total number of records which can be played are disposed on the turntable, then with the tone arm 22 in playing position the spring 134 will again assume the horizontal position it has when the tone arm is first balanced, and if for example the knob 128 has been set at "1," then the stylus pressure will be one gram. If there is only one record on the turntable, then the forward end of the tone arm will be lower than in its original balanced position and the lug 136 will be raised slightly to raise the rear end of the spring 134. The raising and lowering of the forward end of the tone arm in accordance with the number of records on the turntable will not change the position of the forward end of the spring 134 which is anchored to the lug 132, but the rear end of the spring which is anchored to the lug 136 will pivot about the horizontal pivot axis of the tone arm.

When there is but one record on the turntable, the rear end of the spring 134 will move upwardly on an arc defined by the horizontal pivot axis as shown in FIGURE 9, and this will tend to shorten the spring length $l_1$ slightly and thus reduce its force $f_1$. However, at the same time the raising of the rear end of the spring will increase the moment arm $a_1$ slightly so that the resultant moment about the pivot axis will be the same and will still produce the selected one gram stylus pressure. When the maximum number of records are on the turntable, the rear end of the spring 134 will be below a horizontal plane defined by the forward end of the spring, and because the rear spring end moves in an arc about the tone arm pivot axis, the spring in the latter position will be stretched slightly beyond the length it has in the horizontal position to produce a slightly increased force $f$. However, in the latter instance the moment arm $a$ will be decreased slightly to compensate for the increased spring force $f$ and thus again the moment about the pivot axis will remain virtually constant and the stylus pressure will thus remain at one gram in accordance with the setting of the knob 128.

By way of example, the spring 134 is horizontal when the tone arm 22 is first balanced, and depending upon the number of records on the turntable, when the tone arm is in playing position the rear end of the spring will move above or below the horizontal plane defined by the fixed forward end of the spring. The maximum travel of the rear end of the spring 134 relative to the forward end thereof is approximately 1.5 degrees as shown in FIGURE 9, but the spring is arranged so that the maximum travel is approximately 45 minutes above and 45 minutes below the horizontal plane defined by the forward end of the spring.

FIGURE 2 shows a threaded member 140 having a flat head 142 positioned to be engaged by the upper end of a lift pin 144. The member 140 is threaded up into the underside of the hinge hanger base 74, and when the lift pin 144 is raised to engage the head 142, the tone arm tube 22 will be pivoted about its horizontal pivot axis so as to lift the outer end thereof. It is of course well known in the art that mechanism must be provided which is operative during a record change cycle to first lift the outer end of the tone arm 22 and then swing the arm laterally outwardly so as to permit the next record to be dropped to the turntable. Such mechanism does not comprise a part of the present invention and therefore is not fully described herein. However, it will be understood that the tone arm 22 may be swung in and out about its vertical pivot axis by acting upon the lower yoke arm 40, since the latter rotates conjointly with the tone arm about its vertical pivot axis, and as indicated above the tone arm may be lifted from a record which has been played by raising the lift pin 144.

The unique features of the tone arm mechanism described herein produce numerous important advantages not realized by conventional tone arm designs. Thus, the vertical flexible members or wires 89 and 89' suspend the tone arm for movement about its horizontal pivot axis, and the only frictional resistance to such pivotal movement is the inner molecular structure of the wires themselves which is virtually negligible. Most phonograph records are somewhat warped and during the playing of a record the outer end of the tone arm is required to move upwardly and downwardly as the record rotates. Where there is appreciable frictional resistance to such movement, substantial variations in stylus pressure result, but with the present design the stylus pressure remains constant when the outer end of the tone arm moves up and down, thereby eliminating tracking distortion attributed to needle pressure variation. It will also be noted that only a relatively small force must be developed by the tension spring 134 in order to produce the desired stylus pressure, since the tone arm is initially balanced by the counterweight 26, whereas in most conventional designs having no counterweight a spring is required to counterbalance the entire weight of the tone arm except to the extent of the desired stylus pressure.

Another advantage of the present design is provided by the conical bearing 48, since the use of this single bearing for swinging the tone arm about a vertical axis reduces substantially the frictional resistance to such movement. Because there is so little frictional resistance to movement of the tone arm about its vertical pivot axis, the tone arm can be pulled inwardly during playing of a record by a substantially reduced force, and this permits use of a much smaller stylus pressure. It is contemplated that the tone arm described herein may be used with a stylus pressure of between 0.5 and 1.5 grams.

While I have illustrated my invention in a preferred form, I do not intend to be limited to that form, except insofar as the appended claims are so limited, since modifications coming within the scope of my invention will be readily suggested to others with my disclosure before them.

I claim:

1. In a phonograph tone arm assembly, in combination, a rotatable member mounted for movement about a vertical pivot axis, a generally vertical pivot axis, a generally vertical flexible member having its upper end supported from said rotatable member so as to project downwardly therefrom, a bracket disposed beneath said rotatable member and having means thereon for securing the same to the lower end of said vertical flexible member so that said bracket is suspended from said rotatable member by said flexible member, and a tone arm fixedly mounted on said bracket, said tone arm being movable conjointly with said rotatable member about said vertical pivot axis and said tone arm further being movable about a horizontal pivot axis through bending of said flexible member intermediate its supported and secured ends.

2. In a phonograph tone arm assembly, in combination, a rotatable member mounted for movement about a vertical pivot axis, a pair of spaced apart generally vertical flexible members having their upper ends supported from said rotatable member so as to project downwardly therefrom, said vertical flexible members being laterally spaced to opposite sides of said vertical pivot axis, a bracket disposed beneath said rotatable member and having means thereon for securing the same to the lower ends of said pair of vertical flexible members so that said bracket is suspended from said rotatable member by said flexible members, and a tone arm fixedly mounted on said bracket intermediate said means securing the bracket to the lower ends of the vertical flexible members, said tone arm being movable conjointly with said rotatable member about said vertical pivot axis and said tone arm further being movable about a horizontal pivot axis through bending of said flexible members between their secured and supported ends.

3. In a phonograph tone arm assembly, in combination, a rotatable member mounted for movement about a vertical pivot axis, a pair of spaced apart generally vertical flexible members each having an upper end portion supported from said rotatable member so as to project downwardly therefrom, a bracket having a saddle portion between said vertical flexible members and laterally disposed portions beneath said rotatable member, said laterally disposed portions of the bracket having means thereon secured to the lower ends of said pair of vertical flexible members so that said bracket including said saddle portion is suspended from said rotatable member by said flexible members, and a tone arm fixedly mounted on said saddle portion of the bracket and disposed approximately equidistant between the axes of said two flexible members, said tone arm being movable conjointly with said rotatable member about said vertical pivot axis and said tone arm further being movable about a horizontal pivot axis through bending of said flexible members.

4. In a phonograph tone arm assembly, in combination, a rotatable member mounted for movement about a vertical pivot axis, a pair of spaced apart generally vertical flexible members made of wire secured by their upper end to said rotatable member so as to project downwardly therefrom, a bracket disposed between said flexible members and having lateral portions beneath said rotatable member, said lateral portions having means thereon to which the lower end of said pair of flexible members are secured so that said bracket is suspended from said rotatable member by said flexible members, the intermediate portion of said flexible members between their secured upper and lower ends being relatively short and together defining a horizontal axis about which the bracket is pivotable, and a tone arm fixedly mounted on an intermediate portion of said bracket so as to lie above said horizontal axis, said tone arm being movable conjointly with said rotatable member about said vertical pivot axis and said tone arm further being movable about said horizontal pivot axis through bending of said intermediate portion of the flexible members.

5. In a phonograph tone arm assembly, in combination, a rotatable member mounted for movement about a vertical pivot axis, a pair of spaced apart generally vertical flexible wires supported from said rotatable member so as to project downwardly therefrom, a bracket including a saddle portion between said flexible wires and lateral portions disposed beneath said rotatable member, said lateral portions having means thereon for securing the same to the lower end of said pair of vertical flexible wires so that said bracket is suspended from said rotatable member by said flexible wires, and a tone arm fixedly mounted on said saddle portion of the bracket and disposed approximately equidistant between the axes of said two flexible wires, said tone arm being movable conjointly with said rotatable member about said vertical pivot axis and said tone arm further being movable about a horizontal pivot axis through bending of said flexible wires between their secured upper and lower ends.

6. In a phonograph tone arm assembly, in combination, a rotatable member mounted for movement about a vertical pivot axis, a pair of spaced apart generally vertical flexible wires supported from said rotatable member so as to project downwardly therefrom, a bracket disposed beneath said rotatable member and having means thereon for securing the same to said pair of flexible wires so that said bracket is suspended from said rotatable member by said flexible wires, a tone arm fixedly mounted on said bracket, said tone arm being movable conjointly with said rotatable member about said vertical pivot axis and said tone arm further being movable about a horizontal pivot axis through bending of said flexible wires, and first and second interengageable means formed on said rotatable member and on said bracket respectively which limit the permissable relative movement of said rotatable member and said bracket thereby protecting said pair of flexible wires against excessive bending.

7. In a phonograph tone arm assembly, in combination, a rotatable member mounted for movement about a vertical pivot axis, a pair of spaced apart generally vertical flexible wires supported from a first pair of wire holding members on said rotatable member so as to project downwardly therefrom, a bracket disposed beneath said rotatable member and having a second pair of wire holding members thereon for securing the same to said pair of flexible wires so that said bracket is suspended from said rotatable member by said flexible wires, a tone arm fixedly mounted on said bracket, said tone arm being movable conjointly with said rotatable member about said vertical pivot axis and said tone arm further being movable about a horizontal pivot axis through bending of said flexible wires, said first and second pairs of wire holding members being in vertical alignment with one another, and projecting means formed on one of said pairs of wire holding members and complementary recesses formed in the other pair of wire holding members for receiving said projecting means, said projecting means normally being spaced from the walls of said recesses but being engageable thereagainst to limit the permissible relative movement of said rotatable member and said bracket thereby protecting said pair of flexible wires against excessive bending.

8. In a phonograph tone arm assembly, in combination, a rotatable member mounted for movement about a vertical pivot axis, a generally vertical flexible member having its upper end secured to said rotatable member so as to project downwardly therefrom, a bracket disposed beneath said rotatable member and having means thereon for securing the same to the lower end of said vertical flexible member so that said bracket is suspended from said rotatable member by said flexible member, a tone arm fixedly mounted on said bracket so as to lie generally above the free intermediate portion of said flexible member between its upper and lower secured ends, said tone arm being movable conjointly with said rotatable member about said vertical pivot axis and said tone arm further being movable about a horizontal pivot axis spaced therebelow through bending of said free intermediate portion of the flexible member, adjustable counterweight means carried on said tone arm and manually movable along the length thereof for balancing said tone arm about said horizontal pivot axis, and adjustable stylus pressure control means which is manually operable after balancing of the tone arm to select a desired stylus pressure and which acts upon said tone arm to bias the stylus-carrying end thereof downwardly thereby to induce said desired stylus pressure.

9. In a phonograph tone arm assembly, in combination, a rotatable member mounted for movement about a vertical pivot axis, a pair of generally vertical flexible members each having an upper end portion secured to said rotatable member so as to project downwardly therefrom, a bracket disposed beneath said rotatable member and having means thereon for securing the same to the lower ends of said pair of vertical flexible members so that said bracket is suspended from said rotatable member by said flexible members, a tone arm fixedly mounted on said bracket and disposed approximately equidistant between the axes of said two flexible members, and above the free intermediate portion of said vertical flexible members between their secured upper and lower ends, said tone arm being movable conjointly with said rotatable member about said vertical pivot axis and said tone arm further being movable about a horizontal pivot axis defined by bending of the fill intermediate portion of said flexible members, adjustable counterweight means carried on said tone arm and manually movable along the length thereof for balancing said tone arm about said horizontal pivot axis, and adjustable stylus pressure control means which is manually operable after balancing of the tone arm to select a desired stylus pressure and which acts upon said tone arm to bias the stylus-carrying end thereof downwardly thereby to induce said desired stylus pressure.

10. In a phonograph tone arm assembly, in combination, a rotatable member mounted for movement about a vertical pivot axis, a pair of spaced apart generally vertical flexible wires having upper portions secured to said rotatable member so as to project downwardly therefrom, a bracket disposed beneath said rotatable member and having means thereon for securing the same to the lower end of said pair of flexible wires so that said bracket is suspended from said rotatable member by said flexible wires, a tone arm fixedly mounted on said bracket, the intermediate portion of said flexible wires between their secured ends being free for bending and together defining a horizontal pivot axis about which the bracket is pivotable, said tone arm being movable conjointly with said rotatable member about said vertical pivot axis and said tone arm further being movable about said horizontal pivot axis through bending of said intermediate portions of flexible wires, adjustable counterweight means carried on said tone arm and manually movable along the length thereof for balancing said tone arm about said horizontal pivot axis, and adjustable stylus pressure control means which is manually operable after balancing of the tone arm to select a desired stylus pressure and which acts upon said tone arm to bias the stylus-carrying end thereof downwardly thereby to induce said desired stylus pressure.

11. In a phonograph tone arm assembly, in combination, a rotatable member mounted for movement about a vertical pivot axis, a pair of spaced apart generally vertical flexible members having their upper ends secured to said rotatable member so as to project downwardly therefrom, a bracket between said vertical flexible members and having portions disposed beneath said flexible members, said portions having means thereon securing the lower ends of said pair of vertical flexible members to said portions of the bracket so that said bracket is suspended from said rotatable member by said flexible members, a tone arm fixedly mounted on an intermediate portion of said bracket and disposed approximately equidistant between the axes of said two flexible members, said tone arm being movable conjointly with said rotatable member about said vertical pivot axis and said tone arm further being movable with said bracket about a horizontal pivot axis through bending of an intermediate portion of said flexible members between their secured ends adjustable counterweight means carried on said tone arm and manually movable along the length thereof for balancing said tone arm about said horizontal pivot axis, and adjustable stylus presure control mean manually operable after balancing of the tone arm to select a desired stylus pressure, said control means including a stylus pressure control member mounted on said rotatable member and rotatable with respect thereto about a vertical axis, and a spring lying generally above said horizontal axis having its forward end connected to said control member forwardly of said horizontal pivot axis and its rear end connected to the tone arm behind said horizontal pivot axis whereby spring when loaded due to manual rotation of said control member will act upon said tone arm to bias the stylus-carrying end thereof downwardly thereby to induce said desired stylus pressure.

12. In a phonograph tone arm assembly, in combination, a rotatable member mounted for movement about a vertical pivot axis, a pair of spaced apart generally vertical flexible wires having their upper ends supported from said rotatable member so as to project downwardly therefrom, a bracket disposed beneath said rotatable member and having means thereon for securing the same to the lower ends of said pair of flexible wires so that said bracket is suspended from said rotatable member by said flexible wires, a tone arm fixedly mounted on said bracket, said tone arm being movable conjointly with said rotatable member about said vertical pivot axis and said tone arm further being movable about a horizontal pivot axis through bending of said flexible wires between their supported upper and secured lower ends, adjustable counterweight means carried on said tone arm and manually movable along the length thereof for balancing said tone arm about said horizontal pivot axis, and adjustable stylus pressure control means manually operable after balancing of the tone arm to select a desired stylus pressure, said control means including a stylus pressure control member mounted on said rotatable member and rotatable with respect thereto about a vertical axis, and a spring disposed generally above said horizontal pivot axis connected between said control member in front of said horizontal pivot axis and said tone arm behind said horizontal pivot axis which spring when loaded due to manual rotation of said control member will act upon said tone arm to bias the stylus-carrying end thereof downwardly thereby to induce said desired stylus pressure.

13. In a phonograph tone arm assembly, in combination, a housing supported on a conical bearing for movement about a vertical pivot axis, a generally vertical flexible member having its upper end part secured to said housing so as to project downwardly therefrom, a bracket disposed beneath said housing and having means thereon for securing the same to the lower end part of said vertical flexible member so that said bracket is suspended from said housing by said flexible member, the intermediate portion of said flexible member between its secured ends being free for bending to define a horizontal pivot axis about which the bracket is pivotal, and a tone arm fixedly mounted on said bracket above said horizontal pivot axis, said tone arm being movable conjointly with said housing about said vertical pivot axis and said tone arm further being movable with the bracket about said horizontal pivot axis through bending of said intermediate portion of the flexible member.

14. In a phonograph tone arm assembly, in combination, a generally C-shaped yoke mounted on a conical bearing for movement about a vertical pivot axis, a housing fixedly secured to the top of said yoke for conjoint rotation therewith, a pair of spaced apart generally vertical flexible wires supported from said housing so as to project downwardly therefrom, a bracket disposed beneath said housing and having means thereon for securing the same to said pair of flexible wires so that said bracket is suspended from said housing by said flexible wires, and a tone arm fixedly mounted on said bracket, said tone arm being movable conjointly with said housing about said vertical pivot axis, and said tone arm further being movable about a horizontal pivot axis through bending of said flexible wires.

References Cited

UNITED STATES PATENTS

| | | | |
|---|---|---|---|
| 2,484,570 | 10/1949 | Johnson | 274—23 |
| 2,551,506 | 5/1951 | Rockwell | 274—23 |
| 3,078,100 | 2/1963 | Krober | 274—23 |
| 3,093,379 | 6/1963 | Faber et al. | 274—23 |
| 3,129,008 | 4/1964 | Suzuki et al. | 274—23 |
| 3,174,755 | 3/1965 | Taraborreli | 274—23 |
| 3,184,197 | 5/1965 | Aller | 267—1 |
| 2,625,400 | 1/1953 | Lingenbrink | 274—23 |

FOREIGN PATENTS

| | | |
|---|---|---|
| 1,007,074 | 4/1957 | Germany. |

HARRY N. HAROIAN, *Primary Examiner.*

UNITED STATES PATENT OFFICE

CERTIFICATE OF CORRECTION

Patent No. 3,416,807 December 17, 1968

John F. Arent

It is certified that error appears in the above identified patent and that said Letters Patent are hereby corrected as shown below:

Column 1, line 25, "pixot axis" should read -- pivot axis -
Column 9, line 34, "fill" should read -- free --.

Signed and sealed this 10th day of March 1970.

(SEAL)
Attest:

Edward M. Fletcher, Jr.
Attesting Officer

WILLIAM E. SCHUYLER, JR.
Commissioner of Patents